(12) United States Patent
Kozeki et al.

(10) Patent No.: US 12,344,225 B2
(45) Date of Patent: Jul. 1, 2025

(54) VEHICLE

(71) Applicant: HONDA MOTOR CO., LTD., Tokyo (JP)

(72) Inventors: Takahiro Kozeki, Tokyo (JP); Takuya Honjo, Tokyo (JP); Daisuke Takeuchi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 157 days.

(21) Appl. No.: 18/242,244

(22) Filed: Sep. 5, 2023

(65) Prior Publication Data

US 2024/0083409 A1   Mar. 14, 2024

(30) Foreign Application Priority Data

Sep. 9, 2022 (JP) ................. 2022-144065

(51) Int. Cl.
| | | |
|---|---|---|
| *B60W 20/10* | (2016.01) | |
| *B60K 6/52* | (2007.10) | |
| *B60W 10/06* | (2006.01) | |
| *B60W 10/08* | (2006.01) | |
| *B60W 10/119* | (2012.01) | |

(52) U.S. Cl.
CPC ............. *B60W 20/10* (2013.01); *B60K 6/52* (2013.01); *B60W 10/06* (2013.01); *B60W 10/08* (2013.01); *B60W 10/119* (2013.01); *B60W 2510/087* (2013.01); *B60W 2520/10* (2013.01); *B60W 2555/20* (2020.02); *B60Y 2200/92* (2013.01); *B60Y 2306/05* (2013.01); *B60Y 2400/82* (2013.01)

(58) Field of Classification Search
CPC ...... B60W 20/10; B60W 10/06; B60W 10/08; B60W 10/119; B60W 2555/20; B60W 2510/087; B60W 2520/10; B60K 6/52; B60Y 2200/92; B60Y 2306/05; B60Y 2400/82
See application file for complete search history.

(56) References Cited

U.S. PATENT DOCUMENTS

2007/0296290 A1* 12/2007 Tsukashima ........... H02K 5/225
                                                             310/71
2017/0050536 A1*  2/2017 Martin ................. B60K 17/356
(Continued)

FOREIGN PATENT DOCUMENTS

JP        2018-057075 A    4/2018

*Primary Examiner* — Naeem Taslim Alam
(74) *Attorney, Agent, or Firm* — Paratus Law Group, PLLC

(57) ABSTRACT

A vehicle including: a battery; a voltage control unit that boosts an output voltage of the battery; a main drive unit, including an engine and a main drive motor driven by electric power with a boosted voltage, that outputs a main driving force for driving one of a front wheel and a rear wheel by at least one of the engine and the main drive motor; a sub drive unit, including a sub drive motor driven by the electric power with the boosted voltage, that outputs a sub driving force for driving another of the front wheel and the rear wheel; and a control unit, in which, when a temperature of the sub drive unit makes equal to or higher than a predetermined value while the main drive unit outputs the main driving force including a driving force of the engine, the control unit increases the boosted voltage.

6 Claims, 9 Drawing Sheets

(56) References Cited

U.S. PATENT DOCUMENTS

| | | | | |
|---|---|---|---|---|
| 2017/0282894 | A1* | 10/2017 | Kamachi | B60W 20/40 |
| 2018/0251131 | A1* | 9/2018 | Doering | B60W 20/10 |
| 2019/0111913 | A1* | 4/2019 | Shimizu | B60W 50/06 |
| 2022/0402399 | A1* | 12/2022 | Staats | B60L 53/32 |
| 2023/0211657 | A1* | 7/2023 | Ito | B60W 20/19 |
| | | | | 180/243 |

* cited by examiner

< EV RUNNING (ELECTRIC POWER DRIVE MODE) >

< SERIES RUNNING (ELECTRIC POWER DRIVE MODE) >

< ENGINE RUNNING (ENGINE DRIVE MODE) >

(a) VEHICLE
(b) VEHICLE SPEED (c) BOOSTED VOLTAGE (d) SUB DRIVE UNIT TEMPERATURE

VEHICLE

CROSS REFERENCE TO RELATED APPLICATIONS

This application claims priority to Japanese Patent Application No. 2022-144065 filed on Sep. 9, 2022, the content of which is incorporated herein by reference.

TECHNICAL FIELD

The present invention relates to a vehicle.

BACKGROUND ART

In recent years, as a specific measure against global climate change, efforts for realizing a low-carbon society or a decarbonized society have become active. Also, in a vehicle such as an automobile, a reduction in $CO_2$ emissions and an improvement in energy efficiency are required, and electrification of a drive source is progressing. Specifically, a vehicle (hereinafter also referred to as an "electric vehicle", for example, an electrical vehicle) including an electric motor as a drive source for driving drive wheels and a power source (for example, a battery) for supplying electric power to the electric motor has been developed.

In the related art, a vehicle that drives both front wheels and rear wheels, that is, a "four-wheel drive vehicle" is known. For example, JP2018-057075A discloses an electric vehicle including a front wheel drive motor that generates torque for driving front wheels and a rear wheel drive motor that generates torque for driving rear wheels.

There is considered a vehicle including a main drive unit that outputs a main driving force for driving one of a front wheel and a rear wheel and a sub drive unit that outputs a sub driving force for driving the other of the front wheel and the rear wheel by at least one of an engine and a main drive motor. In the related art, there is room for improvement in such a vehicle from the viewpoint of preventing a temperature increase of the sub drive unit.

An object of the present invention is to provide a vehicle capable of preventing a temperature increase of a sub drive unit.

SUMMARY OF INVENTION

According to an aspect of the present invention, there is provided a vehicle including: a battery; a voltage control unit configured to output a boosted voltage obtained by boosting an output voltage of the battery; a main drive unit including an engine and a main drive motor driven by electric power with the boosted voltage output from the voltage control unit, and configured to output a main driving force for driving one of a front wheel and a rear wheel by at least one of the engine and the main drive motor; a sub drive unit including a sub drive motor driven by the electric power with the boosted voltage output from the voltage control unit, and configured to output a sub driving force for driving another of the front wheel and the rear wheel; and a control unit configured to control the voltage control unit, the main drive unit, and the sub drive unit. When a temperature of the sub drive unit makes equal to or higher than a predetermined value while the main drive unit outputs the main driving force including a driving force of the engine, the control unit increases the boosted voltage compared to when the temperature of the sub drive unit is lower than the predetermined value.

DESCRIPTION OF EMBODIMENTS

Figure 1:
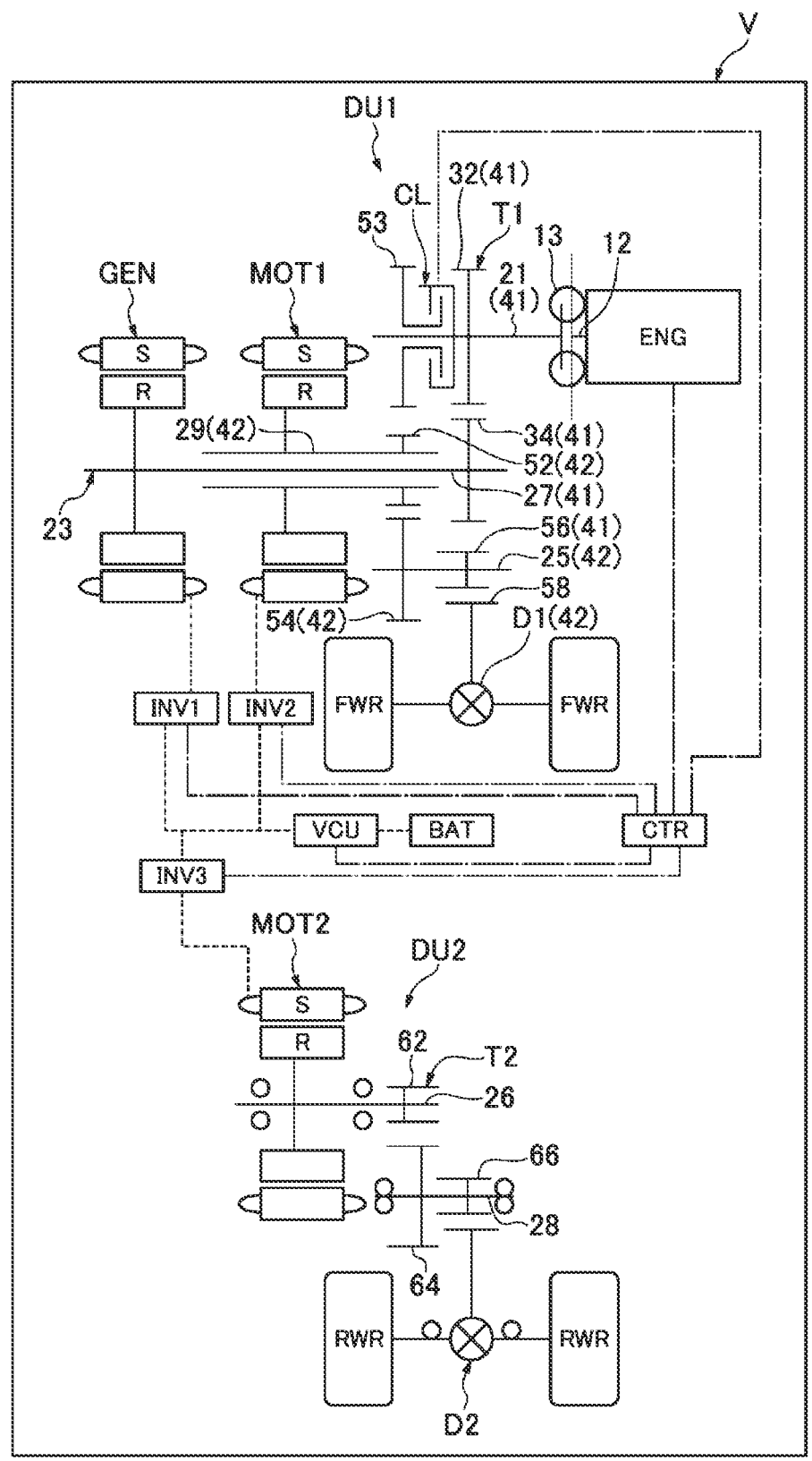
FIG. 1 is a schematic configuration diagram illustrating a schematic configuration of a vehicle according to an embodiment of the present invention.

Hereinafter, an embodiment of a vehicle according to the present invention will be described with reference to the accompanying drawings. In the following description, the same or similar elements are denoted by the same or similar reference numerals, and the description thereof may be omitted or simplified as appropriate.

[Vehicle]

As shown in FIG. 1, a vehicle V of the present embodiment includes a main drive unit DU1 and a sub drive unit DU2 which are mechanically independent. "Mechanically independent" means that power of one drive unit is not mechanically transmitted to the other drive unit by a propeller shaft or the like. In the present embodiment, the main drive unit DU1 outputs a main driving force to drive front wheels FWR and the sub drive unit DU2 outputs a sub driving force to drive rear wheels RWR.

For example, in the present embodiment, the main drive unit DU1 is positioned as a main drive source in the vehicle V, the sub drive unit DU2 is positioned as an auxiliary drive source in the vehicle V. A motor having a relatively larger size is adopted as a main drive motor MOT1 (described later) of the main drive unit DU1, and a motor having a smaller size than the main drive motor MOT1 is adopted as a sub drive motor MOT2 (described later) of the sub drive unit DU2. The main drive unit DU1 is of a water-cooled type, and the sub drive unit DU2 is of an air-cooled type cooled by outside air. Accordingly, the sub drive unit DU2 can be cooled with a simple configuration.

The vehicle V further includes a battery BAT, a voltage control unit VCU, and a control unit CTR.

The battery BAT includes a plurality of storage cells connected in series and supplies a high voltage of, for example, 100 V to 200 V. The storage cell is, for example, a lithium ion battery or a nickel hydrogen battery.

The voltage control unit VCU boosts an output voltage output from the battery BAT as a direct current, and outputs a boosted voltage, which is a voltage obtained by the boosting, to the main drive unit DU1 and the sub drive unit DU2. In other words, in the vehicle V, the boosted voltage generated by the single voltage control unit VCU can be commonly supplied to the main drive unit DU1 and the sub drive unit DU2. The voltage control unit VCU may step down an input voltage input (that is, charged) to the battery BAT. The voltage control unit VCU is, for example, a DC-DC converter.

[Main Drive Unit]

The main drive unit DU1 includes an engine ENG, a generator GEN, the main drive motor MOT1, a first inverter INV1, a second inverter INV2, and a first transmission mechanism T1. The main drive motor MOT1 and the generator GEN are connected to the battery BAT via the voltage control unit VCU, the first inverter INV1, and the second inverter INV2 and are capable of receiving electric power from the battery BAT and regenerating energy to the battery BAT. The dotted line in FIG. 1 indicates the electric power wiring and the alternate long and short dash line indicates the control signal line.

The first inverter INV1 converts a DC voltage into an AC voltage and supplies a three-phase current to the generator GEN. The first inverter INV1 converts the AC voltage generated by the generator GEN into the DC voltage.

The second inverter INV2 converts the DC voltage into the AC voltage and supplies a three-phase current to the main drive motor MOT1. The second inverter INV2 converts the AC voltage generated by the main drive motor MOT1 into the DC voltage when the vehicle V is braked.

The first transmission mechanism T1 includes an input shaft 21, a generator shaft 23, a counter shaft 25, and a first differential mechanism D1, which are arranged parallel to each other.

The input shaft 21 is arranged side by side coaxially with a crankshaft 12 of the engine ENG. The power of the crankshaft 12 is transmitted to the input shaft 21 via a damper 13. The input shaft 21 is provided with an output gear 32 forming a generator drive gear train, which will be described below.

On the side of the input shaft 21 opposite to the engine ENG side, an output gear 53 forming an engine power transmission gear train is provided. A hydraulic clutch CL for connecting detachably the input shaft 21 and the output gear 53 is provided between the output gear 32 and the output gear 53 on the input shaft 21.

The generator shaft 23 is a rotating shaft having a double structure including an inner peripheral shaft 27 and an outer peripheral shaft 29 arranged concentrically with respect to the inner peripheral shaft 27 on the outer peripheral side. An input gear 34 that meshes with the output gear 32 on the input shaft 21 is provided on the engine ENG side of the inner peripheral shaft 27. The output gear 32 on the input shaft 21 and the input gear 34 on the inner peripheral shaft 27 form a generator drive gear train for transmitting the power of the input shaft 21 to the inner peripheral shaft 27.

On the outer diameter side of the inner peripheral shaft 27 substantially at the center, the outer peripheral shaft 29 is installed to be relatively rotatable. The generator GEN is attached to the side of the inner peripheral shaft 27 opposite to the engine ENG side. The generator GEN is configured to include a rotor R fixed to the inner peripheral shaft 27 and a stator S fixed to a case (not shown) and arranged to face the outer diameter side of the rotor R.

The driving force of the input shaft 21 is transmitted to the inner peripheral shaft 27 of the generator shaft 23 via the generator drive gear train, so that the rotor R of the generator GEN rotates with the rotation of the inner peripheral shaft 27. Accordingly, the driving force from the input shaft 21 can be converted into electric power by the generator GEN.

An output gear 52 that meshes with an input gear 54 on the counter shaft 25, which will be described below, is provided on the engine ENG side of the outer peripheral shaft 29, and the main drive motor MOT1 is mounted on the side opposite to the engine ENG side. The main drive motor MOT1 is configured to include a rotor R fixed to the outer peripheral shaft 29 and a stator S fixed to a case (not shown) and arranged to face the outer diameter side of the rotor R.

The output gear 52 on the outer peripheral shaft 29 and the input gear 54 on the counter shaft 25 form a motor power transmission gear train for transmitting the power of the outer peripheral shaft 29 to the counter shaft 25. Therefore, when the outer peripheral shaft 29 is rotated by the driving force of the main drive motor MOT1, the rotation is transmitted to the counter shaft 25 via the motor power transmission gear train.

The counter shaft 25 is provided with an output gear 56 that meshes with a ring gear 58 of the first differential mechanism D1 and the input gear 54 that meshes with the output gear 53 on the input shaft 21 and the output gear 52 on the outer peripheral shaft 29 in order from the engine ENG side. The output gear 53 on the input shaft 21 and the input gear 54 on the counter shaft 25 form an engine power transmission gear train for transmitting the power of the input shaft 21 to the counter shaft 25. The output gear 56 on the counter shaft 25 and the ring gear 58 of the first differential mechanism D1 form a final gear train for transmitting the driving force of the counter shaft 25 to the first differential mechanism D1.

The driving force of the main drive motor MOT1 input to the counter shaft 25 via the motor power transmission gear train and the driving force of the engine ENG input to the counter shaft 25 via the engine power transmission gear train are output as the main driving force of the main drive unit DU1, are transmitted to the first differential mechanism D1 via the final gear train, and are transmitted from the first differential mechanism D1 to the front wheels FWR.

The first transmission mechanism T1 of the main drive unit DU1 of the present embodiment includes a first transmission mechanism 41 that connects the generator GEN and the engine ENG to be capable of transmitting the power and a second transmission mechanism 42 that connects the main drive motor MOT1 and the front wheels FWR to be capable of transmitting the power. That is, the first transmission mechanism 41 includes the input shaft 21, the output gear 32, the input gear 34, and the inner peripheral shaft 27 and the second transmission mechanism 42 includes the outer peripheral shaft 29, the output gear 52, the input gear 54, the counter shaft 25, the output gear 56, and the first differential mechanism D1.

A hydraulic clutch CL is adapted to selectively switch between a state where a power transmission path between the first transmission mechanism 41 and the second transmission mechanism 42 is connected and a state where the power transmission path between the first transmission path and the second transmission path is disconnected. That is, by engaging the hydraulic clutch CL, the power transmission path between the first transmission mechanism 41 and the second transmission mechanism 42 is connected (locked up), and by releasing the hydraulic clutch CL, the power transmission path between the first transmission mechanism 41 and the second transmission mechanism 42 is disconnected. In the first transmission mechanism T1, the input gear 54 meshes with the output gear 53 on the input shaft 21 and the output gear 52 on the outer peripheral shaft 29. Therefore, when the hydraulic clutch CL is engaged, the power transmission path between the first transmission mechanism 41 and the second transmission mechanism 42 is connected and the power transmission between the first transmission mechanism 41 and the second transmission mechanism 42 becomes possible. On the other hand, when the hydraulic clutch CL is released, the output gear 53 is disengaged from the input shaft 21, so that the power transmission path between the first transmission mechanism 41 and the second transmission mechanism 42 is disconnected and the power transmission between the first transmission mechanism 41 and the second transmission mechanism 42 becomes impossible.

[Sub Drive Unit]

The sub drive unit DU2 includes a sub drive motor MOT2, a third inverter INV3, and a second transmission mechanism T2. The sub drive motor MOT2 is connected to the battery BAT via the voltage control unit VCU and the third inverter INV3 and is capable of receiving electric power from the battery BAT and regenerating energy to the battery BAT. The dotted line in FIG. 1 indicates the electric power wiring and the alternate long and short dash line indicates the control signal line.

The second transmission mechanism T2 includes a motor output shaft 26, an output shaft 28, and a second differential mechanism D2, which are arranged parallel to each other.

The sub drive unit DU2 is attached to one end of the motor output shaft 26 of the sub drive motor MOT2 so that a third drive gear 62 rotates integrally, and a third driven gear 64 that meshes with the third drive gear 62 and an output gear 66 are attached to the output shaft 28 that extends parallel to the motor output shaft 26 of the sub drive motor MOT2 to rotate integrally with the output shaft 28. Therefore, the driving force of the sub drive motor MOT2 is transmitted to the output shaft 28 via the third drive gear 62 and the third driven gear 64, and the driving force transmitted to the output shaft 28 is transmitted from the output gear 66 to the rear wheels RWR via the second differential mechanism D2. On the contrary, the driving force from the rear wheels RWR is transmitted to the sub drive motor MOT2 via the second differential mechanism D2, the output gear 66, the output shaft 28, the third driven gear 64, the third drive gear 62, and the motor output shaft 26.

[Drive Mode of Main Drive Unit]

Figure 2:
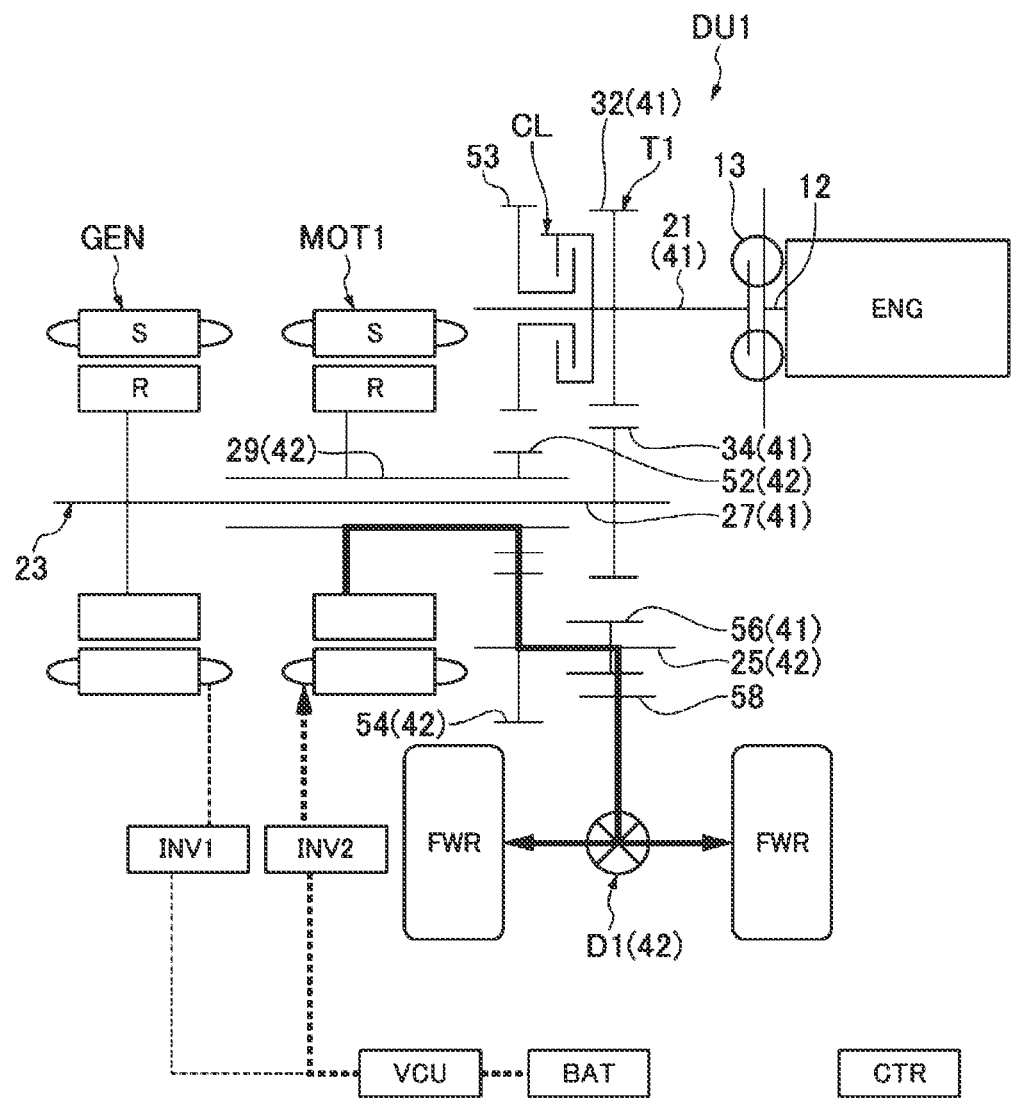
FIG. 2 shows an example of power and electric power flow when a main drive unit is in EV running (electric power drive mode)
Figure 3:
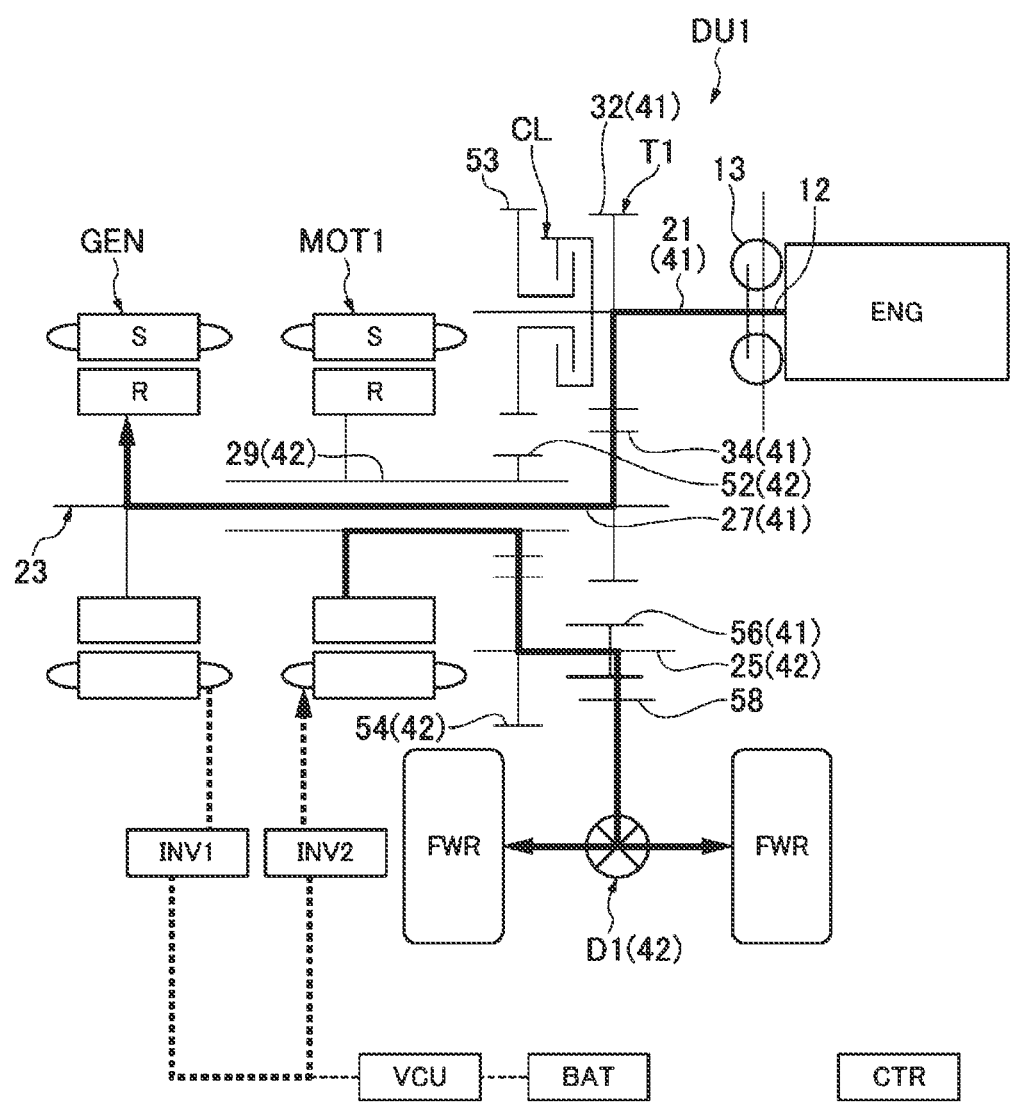
FIG. 3 shows an example of power and electric power flow when the main drive unit is in series running (electric power drive mode)
Figure 4:
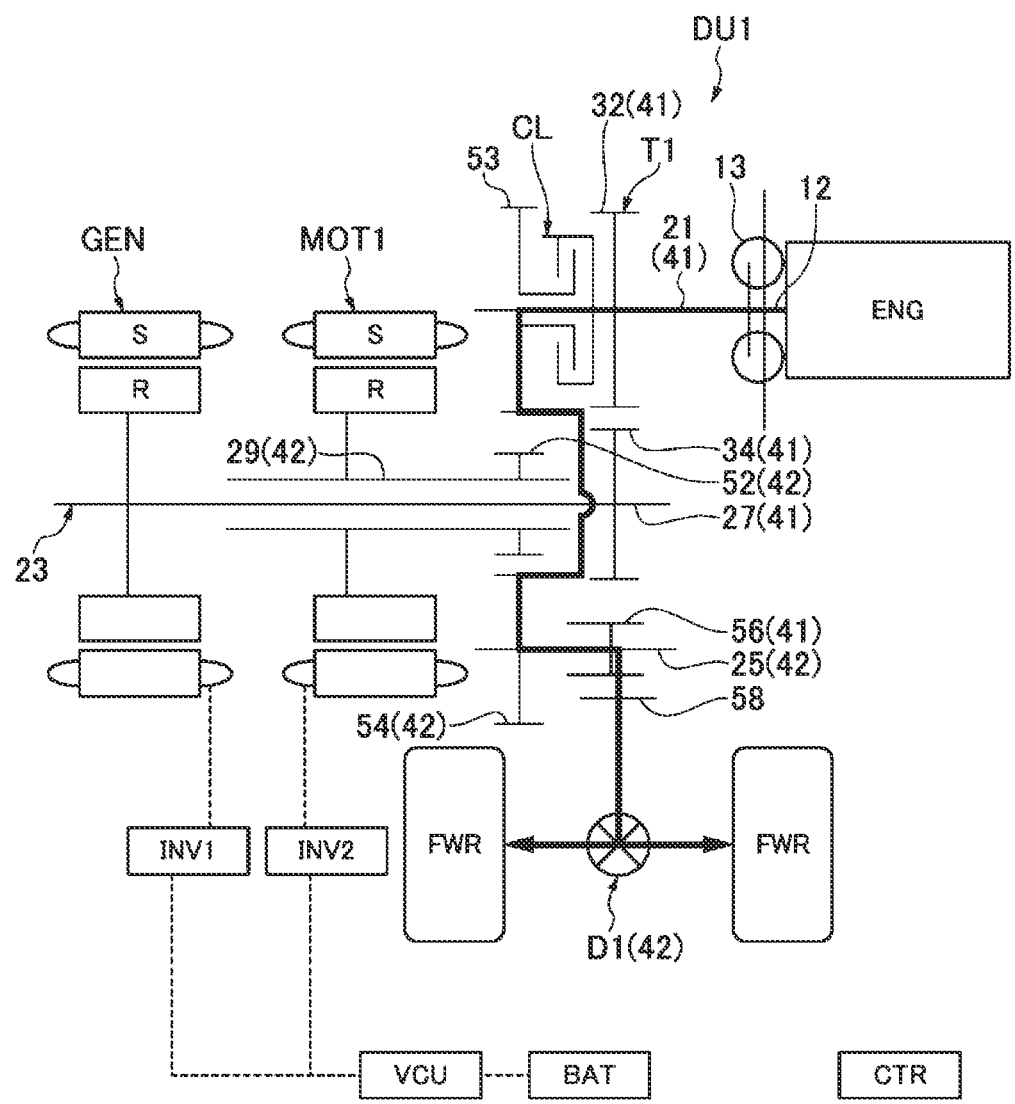
FIG. 4 shows an example of power and electric power flow when the main drive unit is in engine running (engine drive mode)

Next, a drive mode of the main drive unit DU1 will be described with reference to FIGS. 2 to 4. FIGS. 2 to 4 are simplified configurations related to the main drive unit DU1 of FIG. 1, in which the flow of electric power is indicated by a dotted arrow and the flow of power is indicated by a thick solid arrow.

The drive mode of the main drive unit DU1 includes an electric power drive mode that outputs the driving force of the main drive motor MOT1 as the main driving force and an engine drive mode that outputs the driving force of the engine ENG as the main driving force. In the electric power drive mode, the hydraulic clutch CL is released and the driving force of the main drive motor MOT1 is output as the main driving force. The electric power drive mode includes EV running and series running described below. In the engine drive mode, the hydraulic clutch CL is engaged and the driving force of the engine ENG is output as the main driving force. The engine drive mode includes engine running to be described below.

<EV Running (Electric Power Drive Mode)>

As shown in FIG. 2, in the EV running, the engine ENG is put into a non-operating state and the main drive motor MOT1 is driven by the electric power supplied from the battery BAT. That is, by driving the main drive motor MOT1 with the electric power supplied from the battery BAT, the outer peripheral shaft 29 of the generator shaft 23 is rotated by the driving force of the main drive motor MOT1 and the rotation is transmitted to the counter shaft 25 via the motor power transmission gear train. The driving force of the main drive motor MOT1 transmitted as such is output as the main driving force via the final gear train and the first differential mechanism D1, and transmitted to the front wheels FWR. Accordingly, the EV running becomes possible.

<Series Running (Electric Power Drive Mode)>

As shown in FIG. 3, in the series running, the engine ENG is put into an operating state and the main drive motor MOT1 is driven by the electric power generated by the generator GEN. That is, the driving force of the engine ENG is input from the input shaft 21 to the inner peripheral shaft 27 via the generator drive gear train, so that the inner peripheral shaft 27 rotates. Accordingly, the rotor R of the generator GEN fixed to the inner peripheral shaft 27 rotates and electric power is generated by the generator GEN. The electric power generated by the generator GEN is supplied to the main drive motor MOT1 and the main drive motor MOT1 is driven by the electric power. The outer peripheral shaft 29 of the generator shaft 23 is rotated by the driving force of the main drive motor MOT1 and the rotation is transmitted to the counter shaft 25 via the motor power transmission gear train. The driving force of the main drive motor MOT1 transmitted as such is output as the main driving force via the final gear train and the first differential mechanism D1, and transmitted to the front wheels FWR. Accordingly, the series running is possible in which all the driving force of the engine ENG is converted into electricity by the generator GEN to drive.

<Engine Running (Engine Drive Mode)>

As shown in FIG. 4, in the engine running, the driving force of the engine ENG is output as the main driving force and transmitted to the front wheels FWR with the hydraulic clutch CL in the engaged state. That is, by engaging the hydraulic clutch CL, the driving force of the input shaft 21 is transmitted to the counter shaft 25 via the engine power transmission gear train, and is transmitted to the front wheels FWR via the final gear train and the first differential mechanism D1. Accordingly, the engine running becomes possible. Here, since the input shaft 21 and the inner peripheral shaft 27 are always connected via the generator drive gear train, the rotor R of the generator GEN rotates as the inner peripheral shaft 27 rotates. Therefore, the generator GEN can generate electric power, and thus parallel running is also possible in which the main drive motor MOT1 is rotated by the generated electric power and the driving force of the engine ENG and the driving force of the main drive motor MOT1 are output as the main driving force.

[Loss Characteristics of Sub Drive Motor]

Here, an example of loss characteristics of the sub drive motor MOT2 will be described. Generally, as a rotational speed of the sub drive motor MOT2 increases, the loss (that is, heat generation) of the sub drive motor MOT2 increases. When the vehicle V travels at a high travel speed equal to or higher than a constant speed, the vehicle V is in engine running. That is, when the vehicle V travels at a high speed, the main drive unit DU1 can output a main driving force including the driving force of the engine ENG and drive the front wheels FWR by the main driving force to cause the vehicle V to travel.

Thus, also when the vehicle V travels by driving the front wheels FWR with the main driving force of the main drive unit DU1, the rear wheels RWR also rotate as the vehicle V travels, and the sub drive motor MOT2 also rotates as the rear wheels RWR rotate. At this time, the temperature of the sub drive motor MOT2 may increase due to an influence of a back electromotive force generated in the sub drive motor MOT2.

A magnitude of the back electromotive force leading to a temperature increase of the sub drive motor MOT2 depends on a boosted voltage which is an output voltage from the voltage control unit VCU (hereinafter, also simply referred to as a "boosted voltage"), that is, a voltage supplied from the voltage control unit VCU to the sub drive motor MOT2.

Figure 5:
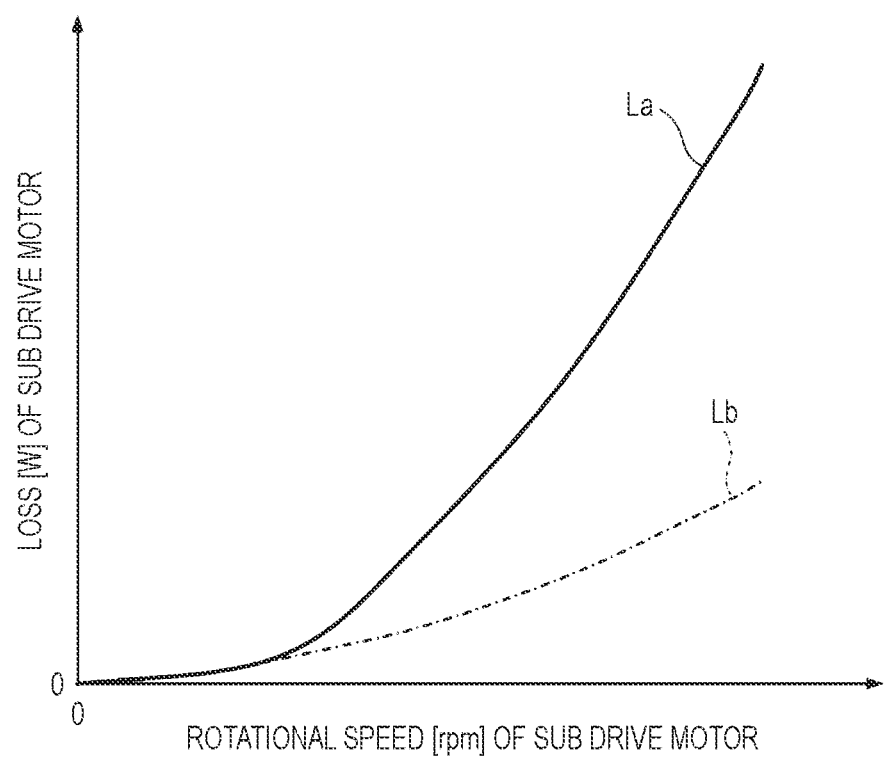
FIG. 5 shows loss characteristics of a sub drive motor.

For example, a loss characteristic La indicated by the solid line in FIG. 5 represents a loss of the sub drive motor MOT2 for each rotational speed of the sub drive motor MOT2 when the boosted voltage is Va [V]. In addition, a loss characteristic Lb indicated by the alternate long and short dash line in FIG. 5 represents a loss of the sub drive motor MOT2 for each rotational speed of the sub drive motor MOT2 when the boosted voltage is Vb [V] (where Vb>Va).

The back electromotive force leading to the temperature increase of the sub drive motor MOT2 increases as the boosted voltage decreases. Therefore, as represented by the loss characteristic La and the loss characteristic Lb in FIG. 5, the loss of the sub drive motor MOT2 increases as the boosted voltage decreases. More specifically, when the boosted voltage is Va [V], the loss of the sub drive motor MOT2 is larger than when the boosted voltage is Vb [V], and the temperature of the sub drive motor MOT2 is likely to increase. The tendency becomes more remarkable as the rotational speed of the sub drive motor MOT2 increases, in other words, as the travel speed of the vehicle V increases. Thus, if the vehicle V travels at a high speed in a state where the boosted voltage is low, there is a possibility that the air-cooled sub drive unit DU2 cannot be completely cooled.

[Control Unit]

The control unit CTR is a device (computer) that controls the entire vehicle V. The control unit CTR is implemented by, for example, an electronic control unit (ECU) including a processor that performs various types of calculation, a storage device including a non-transitory storage medium that stores various types of information, and an input and output device that controls input and output of data between inside and outside of the control unit CTR. The control unit CTR may be implemented by one ECU or may be implemented by cooperation of a plurality of ECUs.

Figure 6:
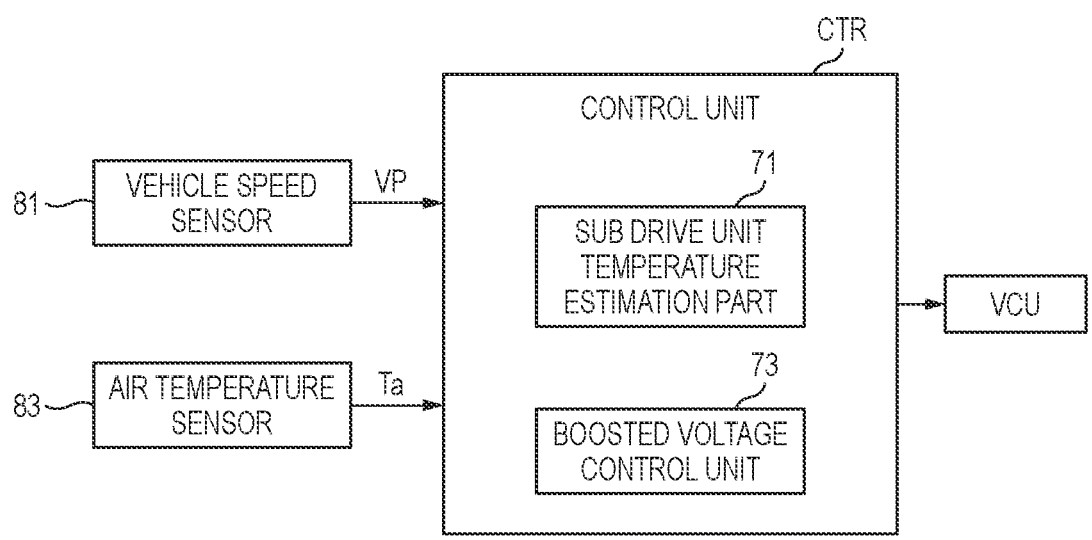
FIG. 6 is a block diagram illustrating an example of a functional configuration of a control unit of the present embodiment.

For example, as shown in FIG. 6, the control unit CTR is capable of controlling input and output of the voltage control unit VCU based on detection values of a vehicle speed sensor 81 and an air temperature sensor 83. The vehicle speed sensor 81 is a sensor that detects a vehicle speed VP which is a travel speed of the vehicle V. The air temperature sensor 83 is a sensor that detects an outside air temperature Ta which is an air temperature around the vehicle V.

More specifically, the control unit CTR includes a sub drive unit temperature estimation part 71 and a boosted voltage control unit 73 as a functional unit implemented by, for example, a processor executing a program stored in advance in a storage device of the control unit CTR or the input and output device of the control unit CTR.

When the main drive unit DU1 outputs the main driving force including the driving force of the engine ENG, in other words, when the vehicle V is in engine running, the sub drive unit temperature estimation part 71 estimates a sub drive unit temperature TRr, which is a temperature of the sub drive unit DU2, based on the vehicle speed VP detected by the vehicle speed sensor 81 and the outside air temperature Ta detected by the air temperature sensor 83.

Figure 7:
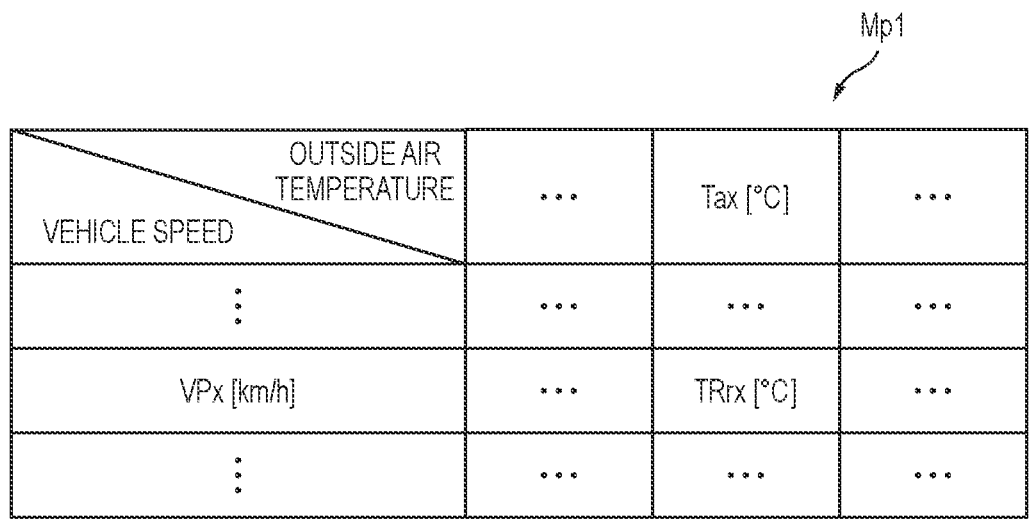
FIG. 7 shows an example of a temperature map of a sub drive unit according to the present embodiment.

For example, a sub drive unit temperature map Mp1 shown in FIG. 7 is stored in the control unit CTR in advance. As shown in FIG. 7, the sub drive unit temperature map Mp1 is information defining a temperature that the sub drive unit DU2 can reach (that is, an assumed highest temperature of the sub drive unit DU2) for each combination of the vehicle speed VP and the outside air temperature Ta.

For example, in the sub drive unit temperature map Mp1 shown in FIG. 7, when the vehicle speed VP is VPx [km/h] and the outside air temperature Ta is Tax [° C.], the temperature that the sub drive unit DU2 can reach is defined as TRrx [° C.]. In the sub drive unit temperature map Mp1, it is determined that the higher the vehicle speed VP and the outside air temperature Ta, the higher the temperature that the sub drive unit DU2 can reach.

The sub drive unit temperature estimation part 71 refers to the sub drive unit temperature map Mp1 and estimates the sub drive unit temperature TRr based on the vehicle speed VP detected by the vehicle speed sensor 81 and the outside air temperature Ta detected by the air temperature sensor 83.

For example, it is assumed that the vehicle speed VP detected by the vehicle speed sensor 81 is VPx [km/h] and the outside air temperature Ta detected by the air temperature sensor 83 is Tax [° C.]. In this case, the sub drive unit temperature estimation part 71 estimates TRrx [° C.] corresponding to the combination of VPx [km/h] and Tax [° C.] in the sub drive unit temperature map Mp1 as the sub drive unit temperature TRr.

In this way, by estimating the sub drive unit temperature TRr based on the vehicle speed VP (that is, the travel speed of the vehicle V) and the outside air temperature Ta (that is, the air temperature around the vehicle V), it is possible to acquire the sub drive unit temperature TRr with high accuracy without adding a sensor or the like for detecting the sub drive unit temperature TRr.

Further, the sub drive unit temperature estimation part 71 may estimate the current and subsequent (that is, future) sub drive unit temperature TRr. In estimating (that is, predicting) the future sub drive unit temperature TRr, the sub drive unit temperature estimation part 71 may use the current vehicle speed VP (that is, a detection value of the vehicle speed sensor 81) or a predicted value of the future vehicle speed VP. The predicted value of the vehicle speed VP can be acquired from, for example, a travel plan of the vehicle V. The travel plan of the vehicle V can be acquired from, for example, a navigation device provided in the vehicle V.

The boosted voltage control unit 73 controls a boosted voltage, which is the output voltage from the voltage control unit VCU, based on the sub drive unit temperature TRr estimated by the sub drive unit temperature estimation part 71. For example, the boosted voltage control unit 73 determines whether the sub drive unit temperature TRr is equal to or higher than a predetermined Tth [° C.]. In a case where it is determined that the sub drive unit temperature TRr is equal to or higher than Tth [° C.], the boosted voltage control unit 73 increases the boosted voltage compared to a case where it is determined that the sub drive unit temperature TRr is not equal to or higher than Tth [° C.]. Here, Tth [° C.] is set in advance in the control unit CTR by a manufacturer or the like of the vehicle V.

Figure 8:
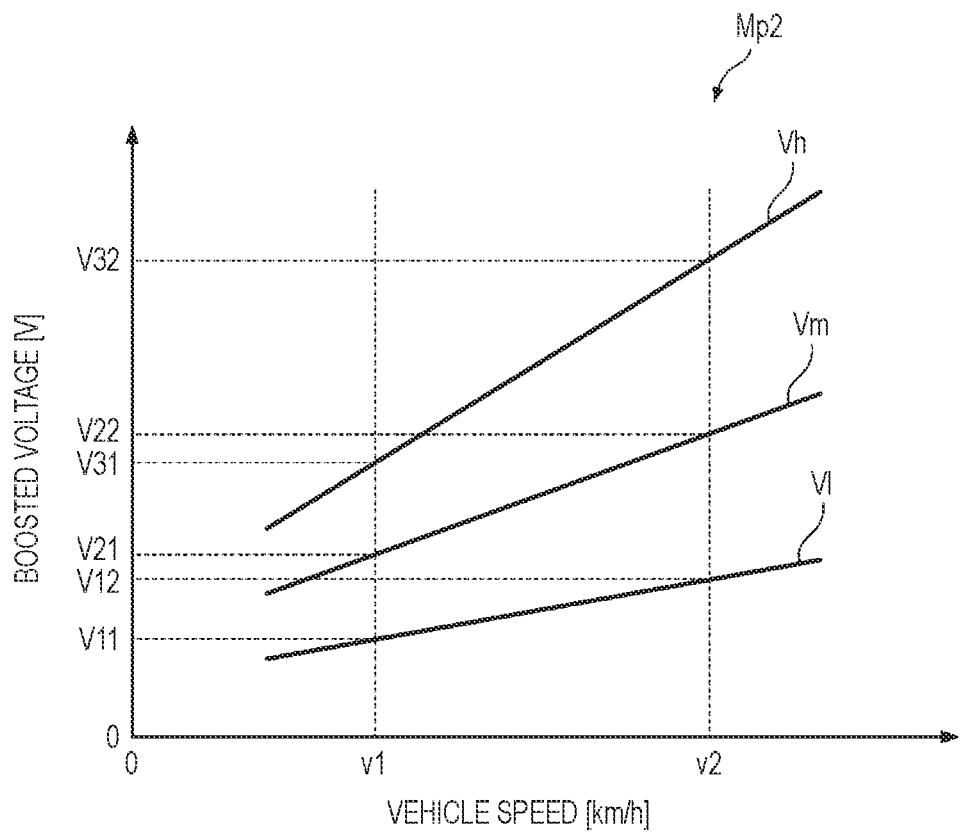
FIG. 8 shows an example of a boosted voltage map of the present embodiment.

In the control unit CTR, for example, a boosted voltage map Mp2 shown in FIG. 8 is stored in advance. The boosted voltage map Mp2 is information defining the boosted voltage for each combination of the vehicle speed VP and the outside air temperature Ta. In a case where it is determined that the sub drive unit temperature TRr is equal to or higher than Tth [° C.], the boosted voltage control unit 73 refers to the boosted voltage map Mp2, determines a boosted voltage based on the vehicle speed VP detected by the vehicle speed sensor 81 and the outside air temperature Ta detected by the air temperature sensor 83, and controls the voltage control unit VCU to output the determined boosted voltage.

More specifically, in the boosted voltage map Mp2 shown in FIG. 8, a boosted voltage Vl defines a boosted voltage corresponding to each vehicle speed VP when the outside air temperature Ta is Tl [° C.]. As an example, the boosted voltage Vl indicates that a boosted voltage when the vehicle speed VP is v1 [km/h] is V11 [V]. Accordingly, when the vehicle speed VP detected by the vehicle speed sensor 81 is v1 [km/h] and the outside air temperature Ta detected by the air temperature sensor 83 is "Tl", the boosted voltage control unit 73 controls the voltage control unit VCU such that the boosted voltage becomes V11 [V].

As another example, the boosted voltage Vl indicates that a boosted voltage when the vehicle speed VP is v2 [km/h] (where v2>v1) is V12 [V] (where V12>V11). Accordingly, when the vehicle speed VP detected by the vehicle speed sensor 81 is v2 [km/h] and the outside air temperature Ta detected by the air temperature sensor 83 is "Tl", the boosted voltage control unit 73 controls the voltage control unit VCU such that the boosted voltage becomes V12 [V].

Further, in the boosted voltage map Mp2 shown in FIG. 8, a boosted voltage Vm defines a boosted voltage corresponding to each vehicle speed VP when the outside air temperature Ta is Tm [° C.] (where Tm>Tl). As an example, the boosted voltage Vm indicates that a boosted voltage when the vehicle speed VP is v1 [km/h] is V21 [V]. Accordingly, when the vehicle speed VP detected by the vehicle speed sensor 81 is v1 [km/h] and the outside air temperature Ta detected by the air temperature sensor 83 is "Tm", the boosted voltage control unit 73 controls the voltage control unit VCU such that the boosted voltage becomes V21 [V].

As another example, the boosted voltage Vm indicates that a boosted voltage when the vehicle speed VP is v2 [km/h] is V22 [V] (where V22>V21). Accordingly, when the vehicle speed VP detected by the vehicle speed sensor 81 is v2 [km/h] and the outside air temperature Ta detected by the air temperature sensor 83 is "Tm", the boosted voltage control unit 73 controls the voltage control unit VCU such that the boosted voltage becomes V22 [V].

Further, in the boosted voltage map Mp2 shown in FIG. 8, a boosted voltage Vh defines a boosted voltage corresponding to each vehicle speed VP when the outside air temperature Ta is Th [° C.] (where Th>Tm). As an example, the boosted voltage Vh indicates that a boosted voltage when the vehicle speed VP is v1 [km/h] is V31 [V]. Accordingly, when the vehicle speed VP detected by the vehicle speed sensor 81 is v1 [km/h] and the outside air temperature Ta detected by the air temperature sensor 83 is "Th", the boosted voltage control unit 73 controls the voltage control unit VCU such that the boosted voltage becomes V31 [V].

As another example, the boosted voltage Vh indicates that a boosted voltage when the vehicle speed VP is v2 [km/h] is V32 [V] (where V32>V31). Accordingly, when the vehicle speed VP detected by the vehicle speed sensor 81 is v2 [km/h] and the outside air temperature Ta detected by the air temperature sensor 83 is "Th", the boosted voltage control unit 73 controls the voltage control unit VCU such that the boosted voltage becomes V32 [V].

In this way, when the sub drive unit temperature TRr is equal to or higher than Tth [° C.], the boosted voltage control unit 73 (that is, the control unit CTR) increases the boosted voltage as the vehicle speed VP (that is, the travel speed of the vehicle V) increases.

That is, as described above, the heat generation of the sub drive unit DU2 (that is, the loss of the sub drive unit DU2) due to a small boosted voltage tends to increase as the vehicle speed VP increases, in other words, as the rotational speed of the sub drive motor MOT2 increases. Therefore, by increasing the boosted voltage as the vehicle speed VP increases, it is possible to reduce the heat generation of the sub drive unit DU2 and prevent the temperature increase of the sub drive unit DU2, compared to a case where the boosted voltage is constant regardless of the vehicle speed VP.

If the sub drive unit temperature TRr is equal to or higher than Tth [° C.], the boosted voltage control unit 73 (that is, the control unit CTR) increases the boosted voltage as the outside air temperature Ta (that is, the air temperature around the vehicle V) increases. That is, the sub drive unit temperature TRr tends to increase as the outside air temperature Ta increases. Therefore, by increasing the boosted voltage as the outside air temperature Ta increases, it is possible to reduce the heat generation of the sub drive unit DU2 and prevent the temperature increase of the sub drive unit DU2, compared to a case where the boosted voltage is constant regardless of the outside air temperature Ta.

Considering that the higher the vehicle speed VP or the outside air temperature Ta, the higher the sub drive unit temperature TRr, the boosted voltage control unit 73 (that is, the control unit CTR) may increase the boosted voltage as the sub drive unit temperature TRr increases.

If it is determined that the sub drive unit temperature TRr is not equal to or higher than Tth [° C.], the boosted voltage control unit 73 determines the boosted voltage by referring to a map (hereinafter, also referred to as a "normal boosted voltage map") different from the boosted voltage map Mp2 shown in FIG. 8, for example. Similar to the boosted voltage map Mp2, the normal boosted voltage map may be the information defining the boosted voltage for each combination of the vehicle speed VP and the outside air temperature Ta, but the defined boosted voltage is generally lower than that in the boosted voltage map Mp2.

For example, although not shown, in the normal boosted voltage map, the boosted voltage when the vehicle speed VP is v1 km/h and the outside air temperature Ta is Tl [° C.] is V15 [V] lower than V11 [V]. In the normal boosted voltage map, the boosted voltage when the vehicle speed VP is v2 km/h and the outside air temperature Ta is Tl [° C.] is V16 [V] lower than V12 [V].

If the sub drive unit temperature TRr is not equal to or higher than Tth [° C.], the boosted voltage control unit 73 (that is, the control unit CTR) controls the boosted voltage based on such a normal boosted voltage map, thereby making it possible to reduce the boosted voltage compared to a case where the sub drive unit temperature TRr is equal to or higher than Tth [° C.]. Accordingly, it is possible to prevent the heat generation of the main drive unit DU1 (that is, the loss of the main drive unit DU1) due to a large boosted voltage and prevent the temperature increase of the main drive unit DU1.

[Specific Example of Control of Boosted Voltage Performed by Control Unit]

Next, a specific example of control of a boosted voltage performed by the control unit CTR in a case where the vehicle V transitions from the series running to the engine running will be described with reference to FIG. 9. A solid line in FIG. 9 indicates a case according to the present embodiment in which the boosted voltage is increased based on the determination that the sub drive unit temperature TRr is equal to or higher than Tth [° C.]. Further, an alternate long and short dash line in FIG. 9 indicates a comparative example in which the control of the boosted voltage as in the present embodiment is not performed.

Figure 9:
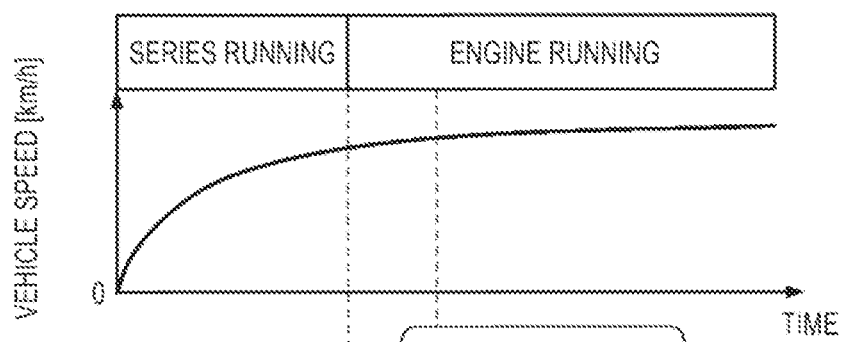
FIG. 9 is an explanatory diagram illustrating control of a boosted voltage performed by the control unit of the present embodiment.
Figure 9:
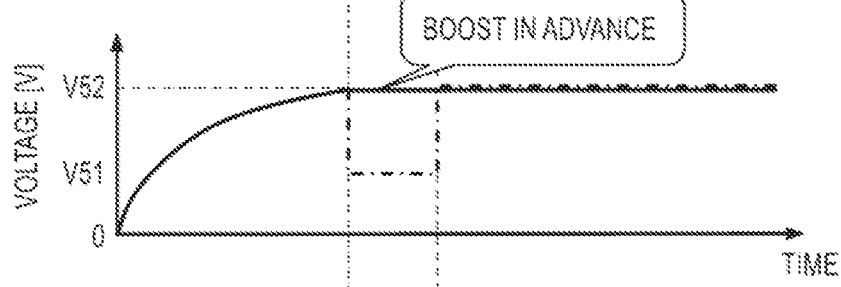
Figure 9:
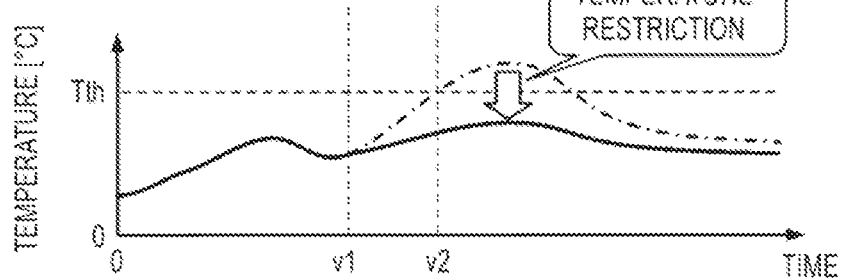

For example, as shown in part (c) of FIG. 9, a control unit CTR of the comparative example sets the boosted voltage to V51 [V] lower than the previous V52 [V] from time t1 at which the vehicle V transitions from the series running to the engine running. This is because the electric power required by the main drive motor MOT1 is reduced by the transition from series running to engine running.

In the comparative example, as the boosted voltage is reduced due to the transition to the engine running, the heat generation of the sub drive motor MOT2 caused by the back electromotive force increases, and as shown in part (d) of FIG. 9, the sub drive unit temperature TRr increases. The control unit CTR sets the boosted voltage to V52 [V] in order to prevent the temperature increase of the sub drive unit DU2, for example, from a time point t2 at which the sub drive unit temperature TRr reaches Tth [° C.]. However, since the sub drive unit DU2 is of an air-cooled type, it takes time for the temperature of the sub drive unit DU2 having reached T50 [° C.] to decrease to a temperature at which the sub drive unit DU2 can exhibit original performance. During this period, the sub drive unit DU2 may not exhibit the original performance.

On the other hand, if the control unit CTR of the present embodiment determines that the sub drive unit temperature TRr is equal to or higher than Tth [° C.] before the time t1, the control unit CTR can maintain the boosted voltage at V52 [V] even after the time t1 at which the vehicle transitions to the engine running. In other words, the control unit CTR of the present embodiment can set the boosted voltage to V52 [V] in advance before the temperature of the sub drive unit DU2 reaches Tth [° C.]. Accordingly, as shown in part (d) of FIG. 9, it is possible to prevent the temperature of the sub drive unit DU2 from reaching Tth [° C.] by preventing the temperature increase of the sub drive unit DU2 even after the time t1. Thus, it is possible to allow the sub drive unit DU2 to exhibit the original performance.

[Example of Processing Executed by Control Unit]

Next, an example of processing executed by the control unit CTR will be described with reference to FIG. 10. For example, the control unit CTR repeatedly executes a series of processes shown in FIG. 10 in a predetermined cycle while the vehicle V is being started (for example, while an ignition power source is on).

Figure 10:
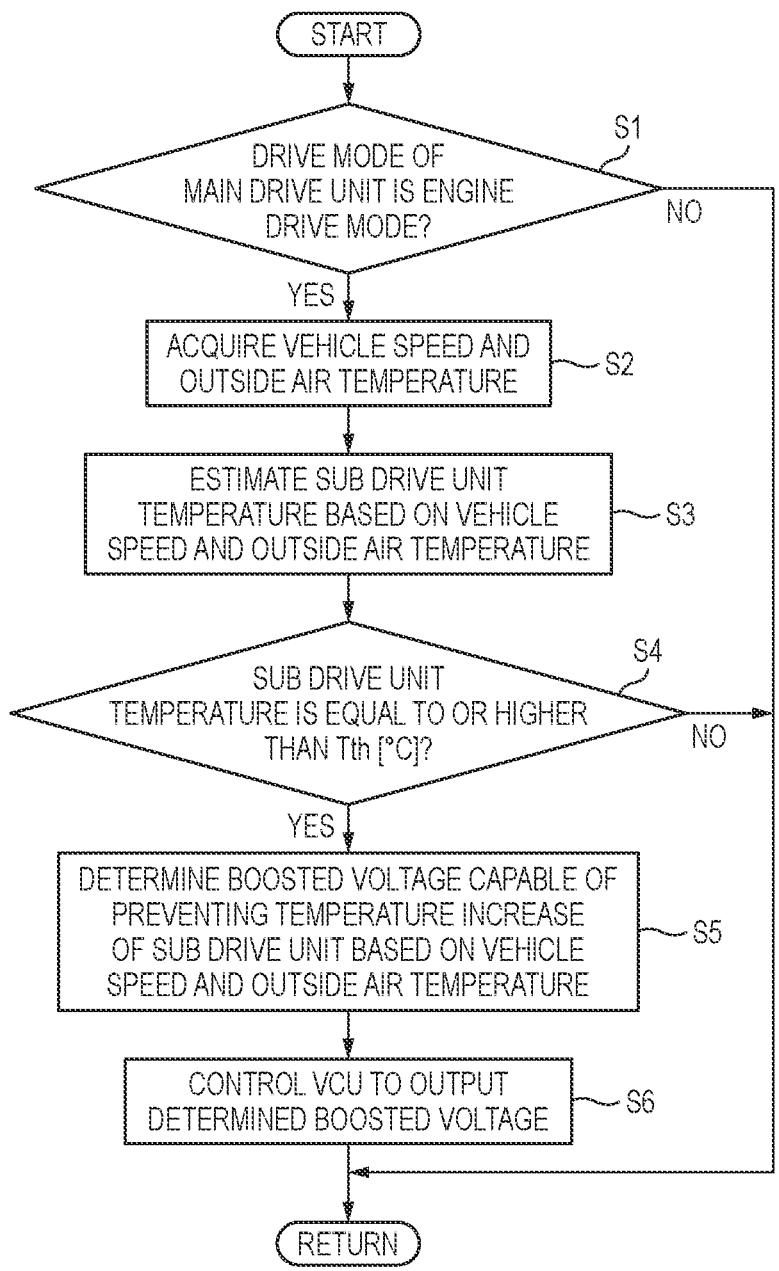
FIG. 10 is a flowchart illustrating an example of processing executed by the control unit of the present embodiment.

As shown in FIG. 10, the control unit CTR first determines whether a drive mode of the main drive unit DU1 is an engine drive mode (that is, the vehicle V is in engine running) (step S1). If it is determined that the drive mode of the main drive unit DU1 is not the engine drive mode (step S1: No), the control unit CTR ends the series of processes shown in FIG. 10.

On the other hand, if it is determined that the drive mode of the main drive unit DU1 is the engine drive mode (step S1: Yes), the control unit CTR acquires a vehicle speed VP from the vehicle speed sensor 81 and an outside air temperature Ta from the air temperature sensor 83 (step S2). Then, the control unit CTR estimates a sub drive unit temperature TRr based on the acquired vehicle speed VP and the outside air temperature Ta (step S3).

Next, the control unit CTR determines whether the sub drive unit temperature TRr is equal to or higher than Tth [° C.] (step S4). If it is determined that the sub drive unit temperature TRr is not equal to or higher than Tth [° C.] (step S4: No), the control unit CTR ends the series of processes shown in FIG. 10.

On the other hand, if it is determined that the sub drive unit temperature TRr is equal to or higher than Tth [° C.] (step S4: Yes), the control unit CTR refers to the boosted voltage map Mp2 and determines a boosted voltage capable of preventing the temperature increase of the sub drive unit DU2 based on the vehicle speed VP and the outside air temperature Ta acquired in step S2 (step S5). Accordingly, the control unit CTR can determine a higher boosted voltage than in the case where it is determined that the sub drive unit temperature TRr is not equal to or higher than Tth [° C.].

Then, the control unit CTR controls the voltage control unit VCU to output the boosted voltage determined in step S5 (step S6), and ends the series of processes shown in FIG. 10.

As described above, in a case where it is determined that the sub drive unit temperature TRr is equal to or higher than Tth [° C.], the control unit CTR of the present embodiment increases the boosted voltage output from the voltage control unit VCU compared to the case where the temperature of the sub drive unit DU2 is not equal to or higher than Tth [° C.]. Accordingly, it is possible to reduce the heat generation of the sub drive unit DU2 due to a small boosted voltage and prevent the temperature increase of the sub drive unit DU2.

Although an embodiment of the present invention has been described above with reference to the drawings, it is needless to say that the present invention is not limited to the example. It is apparent that those skilled in the art can conceive of various modifications and alterations within the scope described in the claims, and it is understood that such modifications and alterations naturally fall within the technical scope of the present invention. In addition, the respective constituent elements in the above embodiment may be combined as desired without departing from the gist of the invention.

For example, in the above embodiment, the main drive unit DU1 drives the front wheels FWR and the sub drive unit DU2 drives the rear wheels RWR. However, the main drive unit DU1 may drive the rear wheels RWR and the sub drive unit DU2 may drive the front wheels FWR.

Further, in the above embodiment, the main drive unit DU1 is a main drive source of the vehicle V, and the sub drive unit DU2 is an auxiliary drive source. However, the main drive unit DU1 may be an auxiliary drive source, and the sub drive unit DU2 may be the main drive source of the vehicle V.

In the above embodiment, the main drive unit DU1 is a "coaxial" hybrid mechanism, but the present invention is not limited thereto. For example, the main drive unit DU1 may be a "parallel-shaft type" hybrid mechanism. Hereinafter, an example in which the main drive unit DU1 is a parallel-shaft type hybrid mechanism will be described with reference to FIG. 11. In the following description, points different from the above embodiment will be mainly described, and description and illustration of points common to the above embodiment will be appropriately omitted.

[Modification of Main Drive Unit]

Figure 11:
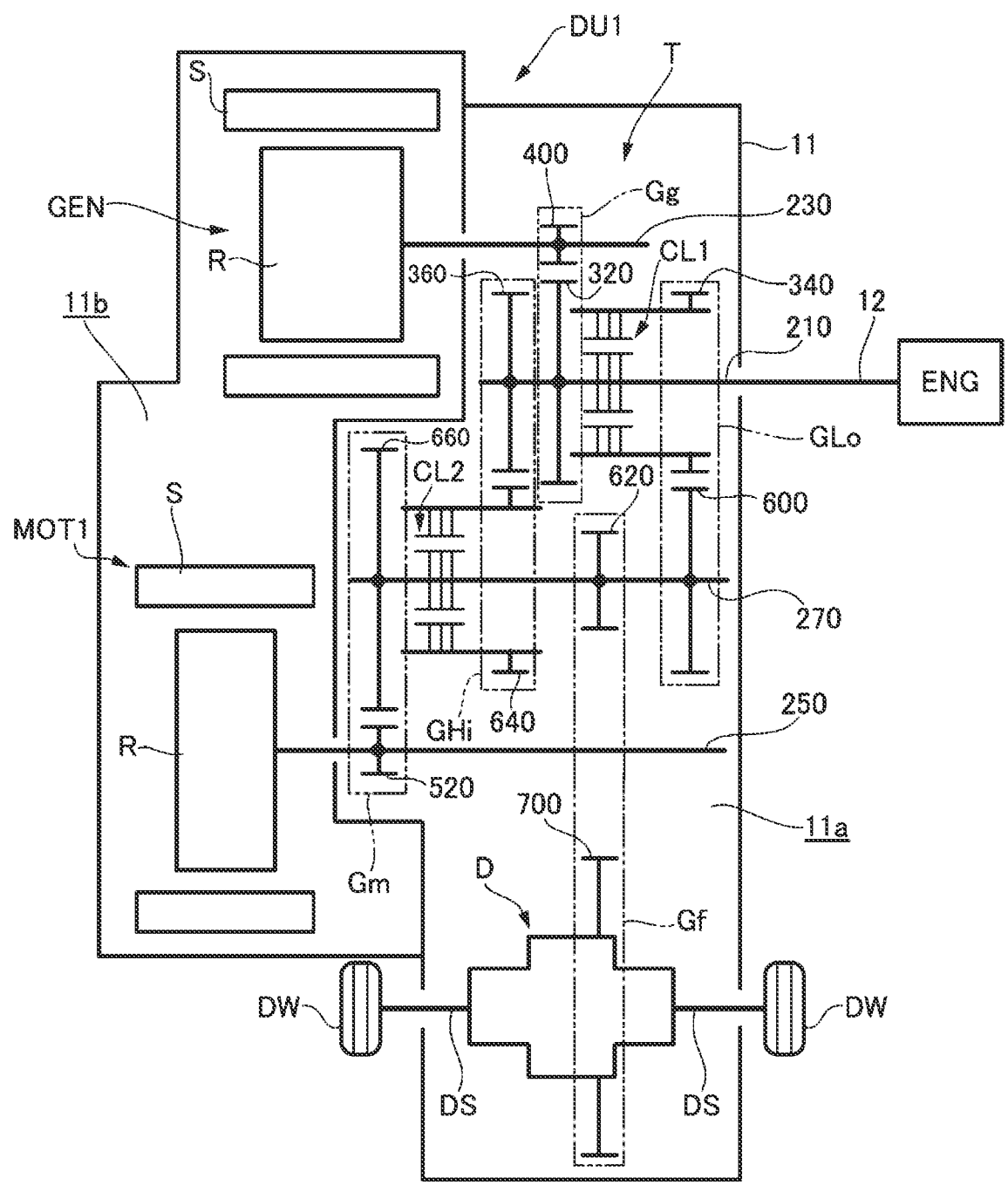
FIG. 11 shows a modification of the main drive unit.

As shown in FIG. 11, a main drive unit DU1 of the present modification includes an engine ENG, a generator GEN, a main drive motor MOT1, a first transmission mechanism T1, and a case 11 that houses the generator GEN, the main drive motor MOT1, and the first transmission mechanism T1. The main drive motor MOT1 and the generator GEN are connected to a battery BAT via a voltage control unit VCU, a first inverter INV1, and a second inverter INV2, which are not illustrated in FIG. 11, and are capable of receiving electric power from the battery BAT and regenerating energy to the battery BAT.

[First Transmission Mechanism]

The case 11 is provided with a transmission housing chamber 11a that houses the first transmission mechanism T1 and a motor housing chamber 11b that houses the main drive motor MOT1 and the generator GEN from the engine ENG side along an axial direction.

The transmission housing chamber 11a houses an input shaft 210, a generator shaft 230, a motor shaft 250, a counter shaft 270, and a differential mechanism D (for example, a first differential mechanism D1), which are arranged parallel to each other.

The input shaft 210 is arranged side by side coaxially with the crankshaft 12 of the engine ENG. The driving force of the crankshaft 12 is transmitted to the input shaft 210 via a damper (not shown). The input shaft 210 is provided with a generator drive gear 320 forming a generator gear train Gg.

With respect to the generator drive gear 320, the input shaft 210 is provided with a low-speed drive gear 340 forming a low-speed engine gear train GLo via a first clutch CL1 on the engine side, and a high-speed drive gear 360 forming a high-speed engine gear train GHi on the side opposite to the engine side (hereinafter referred to as a motor side). The first clutch CL1 is a hydraulic clutch for detachably connecting the input shaft 210 and the low-speed drive gear 340, and is a multi-plate friction clutch.

The generator shaft 230 is provided with a generator driven gear 400 that meshes with the generator drive gear 320. The generator drive gear 320 of the input shaft 210 and the generator driven gear 400 of the generator shaft 230 form a generator gear train Gg for transmitting the rotation of the input shaft 210 to the generator shaft 230. A generator GEN is arranged on the motor side of the generator shaft 230. The generator GEN is configured to include a rotor R fixed to the generator shaft 230, and a stator S fixed to the case 11 and arranged to face the outer diameter side of the rotor R.

The rotation of the input shaft 210 is transmitted to the generator shaft 230 via the generator gear train Gg, so that the rotor R of the generator GEN rotates with the rotation of the generator shaft 230. Accordingly, when the engine ENG is driven, the power of the engine ENG input from the input shaft 210 can be converted into electric power by the generator GEN.

The motor shaft 250 is provided with a motor drive gear 520 forming a motor gear train Gm. The main drive motor MOT1 is arranged closer to the motor side than the motor drive gear 520 on the motor shaft 250. The main drive motor MOT1 includes a rotor R fixed to the motor shaft 250, and a stator S fixed to the case 11 and arranged to face the outer diameter side of the rotor R.

The counter shaft 270 is provided with, in order from the engine side, a low-speed driven gear 600 that meshes with the low-speed drive gear 340, an output gear 620 that meshes with a ring gear 700 of the differential mechanism D, a high-speed driven gear 640 that meshes with the high-speed drive gear 360 of the input shaft 210 via a second clutch CL2, and a motor driven gear 660 that meshes with the motor drive gear 520 of the motor shaft 250. The second clutch CL2 is a hydraulic clutch for detachably connecting the counter shaft 270 and the high-speed driven gear 640, and is a multi-plate friction clutch.

The low-speed drive gear 340 of the input shaft 210 and the low-speed driven gear 600 of the counter shaft 270 form a low-speed engine gear train GLo for transmitting the rotation of the input shaft 210 to the counter shaft 270. The high-speed drive gear 360 of the input shaft 210 and the high-speed driven gear 640 of the counter shaft 270 form a high-speed engine gear train GHi for transmitting the rotation of the input shaft 210 to the counter shaft 270. The low-speed engine gear train GLo including the low-speed drive gear 340 and the low-speed driven gear 600 has a larger speed reduction ratio than the high-speed engine gear train GHi including the high-speed drive gear 360 and the high-speed driven gear 640.

Therefore, by engaging the first clutch CL1 and releasing the second clutch CL2 when the engine ENG is driven, the driving force of the engine ENG is transmitted to the counter shaft 270 via the low-speed engine gear train GLo at a large speed reduction ratio. On the other hand, by releasing the first clutch CL1 and engaging the second clutch CL2 when the engine ENG is driven, the driving force of the engine ENG is transmitted to the counter shaft 270 via the high-speed engine gear train GHi at a small speed reduction ratio. The first clutch CL1 and the second clutch CL2 are not simultaneously engaged.

The motor drive gear 520 of the motor shaft 250 and the motor driven gear 660 of the counter shaft 270 form a motor gear train Gm for transmitting the rotation of the motor shaft 250 to the counter shaft 270. When the rotor R of the main drive motor MOT1 rotates, the rotation of the motor shaft 250 is transmitted to the counter shaft 270 via the motor gear train Gm. Accordingly, w % ben the main drive motor MOT1 is driven, the driving force of the main drive motor MOT1 is transmitted to the counter shaft 270 via the motor gear train Gm.

The output gear 620 of the counter shaft 270 and the ring gear 700 of the differential mechanism D form a final gear train Gf for transmitting the rotation of the counter shaft 270 to the differential mechanism D. Therefore, the driving force of the main drive motor MOT1 input to the counter shaft 270 via the motor gear train Gm, the driving force of the engine ENG input to the counter shaft 270 via the low-speed engine gear train GLo, and the driving force of the engine ENG input to the counter shaft 270 via the high-speed engine gear train GHi are transmitted to the differential mechanism D via the final gear train Gf and transmitted from the differential mechanism D to an axle DS. Accordingly, a driving force for the vehicle V to travel is output via a pair of drive wheels DW (for example, front wheels FWR) provided at both ends of the axle DS.

The main drive unit DU1 configured as described above has a power transmission path for transmitting the driving force of the main drive motor MOT1 to the axle DS (that is, the drive wheels DW), a low-speed power transmission path for transmitting the driving force of the engine ENG to the axle DS, and a high-speed power transmission path for transmitting the driving force of the engine ENG to the axle DS.

Therefore, the vehicle V equipped with the main drive unit DU1 configured as described above can take an electric power drive mode (EV running or series running) in which the driving force of the main drive motor MOT1 is output as the main driving force, and an engine drive mode in which the driving force of the engine ENG is output as the main driving force. In addition, the engine drive mode includes low-speed engine running in which the driving force of the engine ENG is transmitted to the drive wheels DW through the low-speed power transmission path by engaging the first clutch CL1 and releasing the second clutch CL2, and high-speed engine running in which the driving force of the engine ENG is transmitted to the drive wheels DW through the high-speed power transmission path by releasing the first clutch CL1 and engaging the second clutch CL2.

Note that one of the low-speed power transmission path and the high-speed power transmission path in the main drive unit DU1 described above may be omitted, and in the engine drive mode, the driving force of the engine ENG may be transmitted to the drive wheels DW through the other power transmission path that is not omitted.

In the above embodiment, the example of the case where the present invention is applied to the vehicle V that is a hybrid electrical vehicle has been described, but the present invention is not limited thereto. The present invention is also applicable to, for example, a hybrid electrical vehicle such as a battery electric vehicle or a fuel cell electric vehicle.

In the present specification and the like, at least the following matters are described. Although corresponding constituent elements and the like in the above embodiment are shown in parentheses, the present invention is not limited thereto.

(1) A vehicle (vehicle V) including:
a battery (battery BAT);
a voltage control unit (voltage control unit VCU) configured to output a boosted voltage obtained by boosting an output voltage of the battery;
a main drive unit (main drive unit DU1) including an engine (engine ENG) and a main drive motor (main drive motor MOT1) driven by electric power with the boosted voltage output from the voltage control unit, and configured to output a main driving force for driving one of a front wheel (front wheel FWR) and a rear wheel (rear wheel RWR) by at least one of the engine and the main drive motor;
a sub drive unit (sub drive unit DU2) including a sub drive motor (sub drive motor MOT2) driven by the electric power with the boosted voltage output from the voltage control unit, and configured to output a sub driving force for driving another of the front wheel and the rear wheel; and
a control unit (control unit CTR) configured to control the voltage control unit, the main drive unit, and the sub drive unit, in which
when a temperature of the sub drive unit makes equal to or higher than a predetermined value while the main drive unit outputs the main driving force including a driving force of the engine, the control unit increases the boosted voltage compared to when the temperature of the sub drive unit is lower than the predetermined value.

According to (1), the boosted voltage output from the voltage control unit is increased when the temperature of the sub drive unit makes equal to or higher than the predetermined value, compared to when the temperature of the sub drive unit is lower than the predetermined value, and thus it is possible to reduce heat generation of the sub drive unit due to a small boosted voltage and prevent a temperature increase of the sub drive unit.

(2) The vehicle according to (1), in which
the control unit
estimates the temperature of the sub drive unit based on a travel speed of the vehicle and an air temperature around the vehicle when the main drive unit outputs the main driving force including the driving force of the engine, and
increases the boosted voltage when the estimated temperature of the sub drive unit is equal to or higher than the predetermined value.

According to (2), the temperature of the sub drive unit is estimated based on the travel speed of the vehicle and the air temperature around the vehicle, so that the temperature of the sub drive unit can be accurately acquired without adding a sensor for detecting the temperature of the sub drive unit.

(3) The vehicle according to (1) or (2), in which
the control unit increases the boosted voltage as a travel speed of the vehicle increases when the temperature of the sub drive unit makes equal to or higher than the predetermined value.

The heat generation of the sub drive unit due to a small boosted voltage tends to increase as the travel speed of the vehicle increases. According to (3), by increasing the boosted voltage as the travel speed of the vehicle increases, it is possible to reduce the heat generation of the sub drive unit and prevent the temperature increase of the sub drive unit as compared with a case where the boosted voltage is constant regardless of the travel speed of the vehicle.

(4) The vehicle according to any one of (1) to (3), in which
the control unit increases the boosted voltage as an air temperature around the vehicle increases when the temperature of the sub drive unit makes equal to or higher than the predetermined value.

The temperature of the sub drive unit tends to increase as the air temperature around the vehicle increases. According to (4), by increasing the boosted voltage as the air temperature around the vehicle increases, it is possible to reduce the heat generation of the sub drive unit and prevent the temperature increase of the sub drive unit as compared with a case where the boosted voltage is constant regardless of the air temperature around the vehicle.

(5) The vehicle according to any one of (1) to (4), in which
a loss of the sub drive motor increases as the boosted voltage decreases.

According to (5), by increasing the boosted voltage output from the voltage control unit, it is possible to reduce the loss of the sub drive unit and prevent the temperature increase of the sub drive unit.

(6) The vehicle according to any one of (1) to (5), in which
the sub drive unit is of an air-cooled type cooled by outside air.

According to (6), since the sub drive unit is of the air-cooled type cooled by the outside air, the sub drive unit can be cooled with a simple configuration.

What is claimed is:
1. A vehicle comprising:
a battery;
a voltage control unit configured to output a boosted voltage obtained by boosting an output voltage of the battery;
a main drive unit including an engine and a main drive motor driven by electric power with the boosted voltage output from the voltage control unit, and configured to output a main driving force for driving one of a front wheel and a rear wheel by at least one of the engine and the main drive motor;

a sub drive unit including a sub drive motor driven by the electric power with the boosted voltage output from the voltage control unit, and configured to output a sub driving force for driving another of the front wheel and the rear wheel; and a control unit configured to control the voltage control unit, the main drive unit, and the sub drive unit, wherein when a temperature of the sub drive unit is equal to or higher than a predetermined value while the main drive unit outputs the main driving force including a driving force of the engine, the control unit increases the boosted voltage compared to when the temperature of the sub drive unit is lower than the predetermined value.

2. The vehicle according to claim 1, wherein the control unit estimates the temperature of the sub drive unit based on a travel speed of the vehicle and an air temperature around the vehicle when the main drive unit outputs the main driving force including the driving force of the engine, and increases the boosted voltage when the estimated temperature of the sub drive unit is equal to or higher than the predetermined value.

3. The vehicle according to claim 1, wherein the control unit increases the boosted voltage as a travel speed of the vehicle increases when the temperature of the sub drive unit makes equal to or higher than the predetermined value.

4. The vehicle according to claim 1, wherein the control unit increases the boosted voltage as an air temperature around the vehicle increases when the temperature of the sub drive unit makes equal to or higher than the predetermined value.

5. The vehicle according to claim 1, wherein a loss of the sub drive motor increases as the boosted voltage decreases.

6. The vehicle according to claim 1, wherein the sub drive unit is of an air-cooled type cooled by outside air.

* * * * *